(12) United States Patent
Prissok et al.

(10) Patent No.: US 8,715,799 B2
(45) Date of Patent: May 6, 2014

(54) THERMOPLASTIC POLYURETHANE WITH ANTISTATIC PROPERTIES

(75) Inventors: Frank Prissok, Lemfoerde (DE); Frank Schaefer, Stemwede (DE); Gitta Egbers, Lemfoerde (DE); Ruediger Krech, Diepholz (DE); Carsten Guenther, Wagenfeld (DE)

(73) Assignee: BASF SE, Lugwigshafen (DE)

( * ) Notice: Subject to any disclaimer, the term of this patent is extended or adjusted under 35 U.S.C. 154(b) by 745 days.

(21) Appl. No.: 12/668,698

(22) PCT Filed: Jul. 15, 2008

(86) PCT No.: PCT/EP2008/059206
§ 371 (c)(1),
(2), (4) Date: Jan. 12, 2010

(87) PCT Pub. No.: WO2009/010502
PCT Pub. Date: Jan. 22, 2009

(65) Prior Publication Data
US 2010/0221474 A1    Sep. 2, 2010

(30) Foreign Application Priority Data
Jul. 17, 2007 (EP) .................................... 07112644

(51) Int. Cl.
*B32B 1/08* (2006.01)
*C08K 5/34* (2006.01)
*C08K 5/41* (2006.01)

(52) U.S. Cl.
USPC .......... 428/36.9; 428/35.7; 524/106; 524/156

(58) Field of Classification Search
USPC .......... 428/35.7, 36.9; 523/150; 524/106, 156
See application file for complete search history.

(56) References Cited

U.S. PATENT DOCUMENTS

| 4,912,142 | A | 3/1990 | Vermeulen et al. | |
|---|---|---|---|---|
| 6,992,138 | B2 * | 1/2006 | Tsuji et al. | 525/131 |
| 2001/0034390 | A1 | 10/2001 | Okubo et al. | |
| 2003/0032754 | A1 * | 2/2003 | Kaufhold et al. | 528/44 |
| 2006/0100323 | A1 * | 5/2006 | Schmidt et al. | 524/106 |
| 2007/0149749 | A1 * | 6/2007 | Rukavina et al. | 528/44 |
| 2008/0073622 | A1 * | 3/2008 | Housel | 252/519.34 |
| 2009/0300946 | A1 * | 12/2009 | Egbers et al. | 36/103 |

FOREIGN PATENT DOCUMENTS

| DE | 35 28 597 | | 2/1986 | | |
|---|---|---|---|---|---|
| DE | 35 31 660 | | 3/1987 | | |
| EP | 1 134 268 | | 9/2001 | | |
| EP | 1 529 814 | | 5/2005 | | |
| EP | 1556433 | | 7/2005 | | |
| JP | 2006-40659 | * | 7/2004 | | H01B 1/06 |
| WO | 2004 005391 | | 1/2004 | | |
| WO | WO 2007-090755 | * | 8/2007 | | C08K 5/00 |

OTHER PUBLICATIONS

Machine Translation of JP 2006-40659 (Jul. 2004).*
Boewing, G. A. et al., "Kinetics and Reactor Design Aspects of the Synthesis of Inoic Liquids—Experimental and Theoretical Studies for Ethylmethylimidazole Ethylsulfate", Chemical Engineering Science, vol. 62, pp. 1760-1769 (Mar. 2007).

* cited by examiner

*Primary Examiner* — Erik Kashnikow
(74) *Attorney, Agent, or Firm* — Oblon, Spivak, McClelland, Maier & Neustadt, L.L.P.

(57) ABSTRACT

The present invention relates to antistatic, thermoplastic polyurethane comprising ethylmethylimidazole ethyl sulfate, to a process for production of antistatic, thermoplastic polyurethane comprising ethylmethylimidazole ethyl sulfate, and to the use of ethylmethylimidazole ethyl sulfate for the production of antistatic, thermoplastic polyurethane.

20 Claims, No Drawings

THERMOPLASTIC POLYURETHANE WITH ANTISTATIC PROPERTIES

CROSS-REFERENCE TO RELATED APPLICATIONS

This application is a National Stage of PCT/EP2008/059206 filed led Jul. 15, 2008. This application is based upon and claims the benefit of priority to European Application No. 07112644.5 filed Jul. 17, 2007.

BACKGROUND OF THE INVENTION

The present invention relates to antistatic, thermoplastic polyurethane comprising ethylmethylimidazole ethyl sulfate, to a process for production of antistatic, thermoplastic polyurethane comprising ethylmethylimidazole ethyl sulfate, and to the use of ethylmethylimidazole ethyl sulfate for the production of antistatic, thermoplastic polyurethane.

Further embodiments of the present invention are found in the claims, in the description, and in the examples. It is, of course, possible to use the abovementioned features, and the features that will be explained below, of the inventive subject matter not only in the respective combination given but also in other combinations, without exceeding the scope of the invention.

Static charges can arise on electrical nonconductors or on articles or persons insulated via nonconductors, and are often undesired and detrimental, and sometimes dangerous.

The electrical nonconductors are often polymers. Since these polymers mostly cannot be replaced by conducting materials, attempts are made to increase the conductivity of the polymers via addition of antistatic additives, and thus to ground the articles or materials concerned. Polymers which comprise antistatic additives and whose volume resistivity measured to IEC 60093 is smaller than $10^{10}$ $\Omega$/cm are hereinafter termed antistatic polymers. If the volume resistivity of antistatic materials is smaller than $10^8$ $\Omega$/cm, an article manufactured from said material is an "Electronic Sensitive Device" (EDS).

These antistatic polymers are versatile. Antistatic polymers are used not only for shoe-sector applications but also for elastomer rollers, in the sector of manufacturing of electronically sensitive components, and particularly in the sector of pneumatic conveying of solids.

Antistatic additives and antistatic polymers are known. By way of example, DE 3531660 describes antistatic polyurethane shoe soles. The antistatic effect is achieved via from 0.01 to 0.3% by weight of chemically bonded sulfonate groups. The volume resistivities achieved are <$10^8$ $\Omega$/cm.

The use of various quaternary ammonium salts for increasing the conductivity of polymers is described in EP 1134268. This involves modifications of commercially available antistatic agents, such as Catafor F® or Catafor PU® from Rhodia. For example, volume resistivities of about $10^7$ $\Omega$/cm are achieved at high concentrations.

The examples of EP 1134268 show marked dependency of volume resistivity on humidity.

DE 3528597 describes the use of carbon blacks as conductivity improvers. Volume resistivities<$10^9$ $\Omega$/cm are achieved. A disadvantage here is the black coloring of the product and a reduced level of mechanical properties when relatively large amounts of carbon black are used.

WO 2004/005391 relates to the use of ionic liquids in polymers as plasticizers, but also discloses that the ionic liquids simultaneously have an antistatic-additive effect. Polymers that can be used include, inter alia, elastomeric or crosslinked polyurethanes.

A disadvantage of the prior art is that the volume resistivity of this type of polymer is sometimes still very high, >$10^8$ $\Omega$/cm, and that volume resistivities are dependent on humidity. The result can be static charges despite the presence of conductive additives.

A further disadvantage of the antistatic additives proposed in the prior art is that some of them have inadequate long-term effectiveness, the result being that in particular instances the volume resistivity of the polymers increases after as little as a few days.

Finally, high levels of addition of known antistatic additives impair the properties of the materials.

A further problem of known antistatic additives is that these cannot be used in particular in the thermoplastic processing and further processing of thermoplastic polyurethane, since few of these additives withstand the exposure to temperatures of about 220° C., sometimes repeated, in each case for from 5 to 10 minutes, which is necessary for thermoplastic processing and further processing. Furthermore, interactions of the antistatic additives with the polymer matrix often occur under the conditions of thermoplastic processing of polyurethane, the result being an adverse effect on the polymer matrix, for example via degradation of the polymer chains.

The additive must moreover have adequate compatibility with the polymer matrix during processing with thermoplastic polyurethane, so that it does not separate during melting, and so that it is not lost from the final product via exudation or evaporation. A further intention is that the mechanical properties of the thermoplastic polyurethane, for example abrasion or elastomeric properties, are not markedly impaired via addition of the additive.

It was therefore an object of the present invention to provide an antistatic thermoplastic polyurethane which does not exhibit the disadvantages stated above. In particular, it was an object of the present invention to provide an antistatic polyurethane which can be subjected without difficulty to thermoplastic processing, and which does not have any adverse effect on the matrix of the polyurethane, and which gives no excessive exudation of the antistatic additive after production of the antistatic thermoplastic polyurethane.

BRIEF SUMMARY OF THE INVENTION

An antistatic, thermoplastic polyurethane comprising ethylmethylimidazole ethyl sulfate achieves the object of the invention.

DETAILED DESCRIPTION OF THE INVENTION

For the purposes of the invention, "polyurethanes" are any of the known polyisocyanate polyaddition products. For the purposes of the invention, polymer blends comprising polyurethanes and further thermoplastic polymers are also polyurethanes. By way of example, further thermoplastic polymers used can be a polyethylene, polypropylene, polyester, polyether, polystyrene, polycarbonate, PVC, ABS, ASA, SAN, polyacrylonitrile, EVA, PBT, PET, and polyoxymethylene. The content of polyisocyanate polyaddition products in the polyurethane is preferably at least 50% by weight, with preference at least 90% by weight, and in particular 100% by weight.

Thermoplastic polyurethanes are polyurethanes which exhibit thermoplastic properties. Thermoplastic properties here mean that the thermoplastic polyurethane can be melted repeatedly, thereby exhibiting plastic flow.

The thermoplastic polyurethane on which the inventive antistatic thermoplastic polyurethane is based is preferably transparent.

The content of ethylmethylimidazole ethyl sulfate, based on the total weight of the inventive antistatic thermoplastic polyurethane, is usually from 0.001 to 30% by weight, particularly preferably from 0.1 to 5% by weight.

Inventive antistatic thermoplastic polyurethane is usually produced by mixing, (a) organic and/or modified polyisocyanates with (b) at least one relatively high-molar-mass compound having hydrogen atoms reactive toward isocyanate, and (c) if appropriate, low-molar-mass chain extenders, (d) an antistatic additive comprising ethylmethylimidazole ethyl sulfate, (e) catalysts, and (f) if appropriate, other additives, to give a reaction mixture and permitting completion of the reaction mixture.

The isocyanates (a) used, usually diisocyanates, can comprise aliphatic, cycloaliphatic, araliphatic and/or aromatic diisocyanates. By way of example, the following individual aromatic isocyanates may be mentioned: tolylene 2,4-diisocyanate, mixtures composed of tolylene 2,4- and 2,6-diisocyanate, diphenylmethane 4,4'-, 2,4'- and/or 2,2'-diisocyanate, mixtures composed of diphenylmethane 2,4'- and 4,4'-diisocyanate, urethane-modified liquid diphenylmethane 4,4'- and/or 2,4-diisocyanates, 4,4'-diisocyanato-1,2-diphenylethane, and naphthylene 1,5-diisocyanate. Aliphatic diisocyanates used are conventional aliphatic and/or cycloaliphatic diisocyanates, such as tri-, tetra-, penta-, hexa-, hepta- and/or octamethylene diisocyanate, 2-methylpentamethylene 1,5-diisocyanate, 2-ethylbutylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate, dicyclohexylmethane 4,4'-, 2,4'-, and/or 2,2'-diisocyanate. It is preferable that the isocyanate (a) used comprises hexamethylene 1,6-diisocyanate (hexamethylene diisocyanate, HDI) and/or diphenylmethane 4,4'-, 2,4'-, and/or 2,2'-diisocyanate (MDI).

Relatively high-molar-mass compounds (b) used having hydrogen atoms reactive toward isocyanates can be the well known compounds relative toward isocyanates, for example polyesterols, polyetherols, and/or polycarbonatediols, which are also usually brought together within the term "polyols", with molar masses from 500 to 8000, preferably from 600 to 6000, in particular from 800 to less than 3000, and preferably with average functionality toward isocyanates of from 1.8 to 2.3, preferably from 1.9 to 2.2, in particular 2.

For example it is therefore possible to use polyether polyols such as those based on well known starter substances and on conventional alkylene oxides, e.g. ethylene oxide, propylene oxide, and/or butylene oxide, preference being given to polyetherols based on propylene 1,2-oxide and ethylene oxide, and in particular polyoxytetramethylene glycols.

Polyesterols used can be polyesters based on diacids and on diols. Diols used preferably comprise diols having from 2 to 10 carbon atoms, e.g. ethanediol, butanediol, or hexanediol, in particular 1,4-butanediol, or a mixture thereof. Diacids used can comprise any of the known diacids, for example linear or branched-chain diacids having from four to 12 carbon atoms, or a mixture thereof. Adipic acid is preferably used as diacid.

Chain extenders (c) used comprise well known aliphatic, araliphatic, aromatic, and/or cycloaliphatic compounds with molar mass of from 50 to 499, preferably difunctional compounds, such as diamines and/or alkanediols having from 2 to 10 carbon atoms in the alkylene radical, in particular 1,3-propanediol, 1,4-butanediol, 1,6-hexanediol, and/or di-, tri-, tetra-, penta-, hexa-, hepta-, octa-, nona-, and/or decaalkylene glycols having from 3 to 8 carbon atoms, and preferably corresponding oligo- and/or polypropylene glycols, and it is also possible here to use a mixture of the chain extenders. The ratio by weight of the relatively high-molar-mass compound (b) having hydrogen atoms reactive toward isocyanates to chain extender (c) can be from 0.5:1 to 20:1, preferably from 1.5:1 to 13:1, and a higher proportion of chain extender here gives a hard product.

The antistatic additive (d) used comprises an additive comprising ethylmethylimidazole ethyl sulfate. Ethylmethylimidazole ethyl sulfate can be used here alone or in a mixture, for example together with other antistatic additives. It is preferable that ethylmethylimidazole ethyl sulfate is used as sole antistatic additive. The content of ethylmethylimidazole ethyl sulfate, based on the total weight of components (a) to (g), is usually from 0.001 to 30% by weight, particularly preferably from 0.1 to 5% by weight. It is likewise possible to use the antistatic additive (d) in the form of an active-ingredient concentrate. This active-ingredient concentrate comprises by way of example from 30 to 80% by weight of ethylmethylimidazole ethyl sulfate and from 70 to 20% by weight of thermoplastic polyurethane.

Suitable catalysts (e) which in particular accelerate the reaction between the NCO groups of the diisocyanates (a) and the hydroxy groups of the structural components (b) and (c) are the tertiary amines which are conventional and known from the prior art, e.g. triethylamine, dimethylcyclohexylamine, N-methylmorpholine, N,N'-dimethylpiperazine, 2-(dimethylaminoethoxy)ethanol, diazabicyclo[2.2.2]octane, and the like, and also in particular organometallic compounds, such as titanic esters, iron compounds, e.g. ferric acetylacetonate, tin compounds, e.g. stannous diacetate, stannous dioctoate, stannous dilaurate, or the dialkyltin salts of aliphatic carboxylic acids, e.g. dibutyltin diacetate, dibutyltin dilaurate, or the like. The amounts usually used of the catalysts are from 0.0001 to 0.1 part by weight per 100 parts by weight of polyhydroxy compound (b).

Other additives (f) that may be mentioned are blowing agents, surfactants, fillers, nucleating agents, lubricants and mold-release agents, dyes, and pigments, antioxidants, e.g. with respect to hydrolysis, light, heat, or discoloration, metal deactivators, inorganic and/or organic fillers, reinforcing agents, and plasticizers.

Hydrolysis stabilizers used preferably comprise oligomeric and/or polymeric aliphatic or aromatic carbodiimides.

In order to stabilize the inventive, antistatic, thermoplastic polyurethanes with respect to aging, it is preferable that stabilizers are added to the antistatic, thermoplastic polyurethane. For the purposes of the present invention, stabilizers are additives which protect a plastic or a plastics mixture from damaging environmental effects. Examples are primary and secondary antioxidants, hindered amine light stabilizer, UV absorber, hydrolysis stabilizer, quencher, and flame retardant. Examples of commercial stabilizers are given in Plastics Additive Handbook, 5th Edition, H. Zweifel, ed., Hanser Publishers, Munich, 2001 ([1]), pp. 98-136.

If the inventive antistatic, thermoplastic polyurethane has exposure to thermoxidative degradation during its use, antioxidants can be added. It is preferable to use phenolic antioxidants. Examples of phenolic antioxidants are given in Plastics Additive Handbook, 5th edition, H. Zweifel, ed, Hanser Publishers, Munich, 2001, pp. 98-107 and pp. 116-121. Preference is given to those phenolic antioxidants whose molar mass is greater than 700 g/mol. An example of a phenolic antioxidant whose use is preferred is pentaerythrityl tetrakis(3-(3,5-bis(1,1-dimethylethyl)-4-hydroxyphenyl) propionate) (Irganox® 1010). The concentrations generally used of the phenolic antioxidants are from 0.1 to 5% by weight, preferably from 0.1 to 2% by weight, in particular from 0.5 to 1.5% by weight, based in each case on the total weight of the TPU.

If antistatic, thermoplastic polyurethane is exposed to UV light in the invention, this preferably also comprises a UV absorber. UV absorbers are molecules which absorb high-energy UV light and dissipate the energy. Familiar UV absorbers used industrially are, for example, members of the group of cinnamic esters, of diphenylcyanoacrylates, of the formamidines, of the benzylidenemalonates, of the diarylbutadienes, or triazines, or of the benzotriazoles. Examples of commercial UV absorbers are found in Plastics Additive Handbook, 5th edition, H. Zweifel, ed, Hanser Publishers, Munich, 2001, pp. 116-122. In one preferred embodiment, the number-average molar mass of the UV absorbers is greater than 300 g/mol, in particular greater than 390 g/mol. The UV absorbers preferably used should moreover have molar mass no greater than 5000 g/mol, particularly preferably no greater than 2000 g/mol. The benzotriazoles group is particularly suitable as UV absorber. Examples of particularly suitable benzotriazoles are Tinuvin® 213, Tinuvin® 328, Tinuvin® 571, and also Tinuvin® 384, and Eversorb®82. The amounts preferably added of the UV absorbers are from 0.01 to 5% by weight, based on the total weight of antistatic, thermoplastic polyurethane, particularly preferably from 0.1 to 2.0% by weight, in particular from 0.2 to 0.5% by weight, based in each case on the total weight of the antistatic thermoplastic polyurethane.

A UV stabilizer system as described above, based on an antioxidant and on a UV absorber, is often inadequate to ensure good stability of the inventive antistatic, thermoplastic polyurethane with respect to the damaging effect of UV radiation. In this case, a hindered amine light stabilizer (HALS) can also be added to component (e) of the inventive antistatic, thermoplastic polyurethane, preferably in addition to the antioxidant and the UV absorber. The activity of the HALS compounds is based on their ability to form nitroxyl radicals, which intervene in the mechanism of oxidation of polymers. HALS are high-efficiency UV stabilizers for most polymers. HALS compounds are well known and commercially available. Examples of commercially available HALS stabilizers are found in Plastics Additive Handbook, 5th edition, H. Zweifel, Hanser Publishers, Munich, 2001, pp. 123-136. Preferred hindered amine light stabilizers used are hindered amine light stabilizers in which the number-average molar mass is greater than 500 g/mol. Furthermore, the molar mass of the preferred HALS compounds should preferably not be greater than 10000 g/mol, particularly preferably not greater than 5000 g/mol. Particularly preferred hindered amine light stabilizer is the condensate composed of 1-hydroxyethyl-2, 2,6,6-tetramethyl-4-hydroxypiperidine and succinic acid (Tinuvin® 622). The preferred concentration used of HALS compounds is from 0.01 to 5% by weight, particularly preferably from 0.1 to 1% by weight, in particular from 0.15 to 0.3% by weight, based in each case on the total weight of the antistatic, thermoplastic polyurethane. A particularly preferred UV stabilizer system comprises a mixture composed of a phenolic stabilizer, of a benzotriazole, and of a HALS compound, in the preferred amounts described above.

Plasticizers used can comprise any of the plasticizers known for use in TPU. These comprise, for example, compounds which comprise at least one phenolic group. EP 1529814 describes compounds of this type. It is moreover also possible to use polyesters whose molar mass is from about 500 to 1500 g/mol and which are based on dicarboxylic acids, on benzoic acids, and on at least one diol or triol, preferably on a diol. The diacid component used preferably comprises succinic acid, glutaric acid, adipic acid, suberic acid, azelaic acid, decanedicarboxylic acid, maleic acid, fumaric acid, phthalic acid, isophthalic acid, and/or terephthalic acid, and the diol used preferably comprises 1,2-ethanediol, diethylene glycol, 1,2-propanediol, 1,3-propanediol, dipropylene glycol, 1,4-butanediol, 1,5-pentanediol, and/or 1,6-hexanediol. The ratio here of dicarboxylic acid to benzoic acid is preferably 1:10 to 10:1. EP 1556433 gives a more detailed description of these plasticizers, by way of example.

The proportion of the plasticizer, based on the total weight of the antistatic, thermoplastic polyurethane, is preferably from 0.2 to 45% by weight.

Further details concerning the abovementioned auxiliaries and additives are available in the technical literature, e.g. Plastics Additive Handbook, 5th edition, H. Zweifel, editor, Hanser Publishers, Munich, 2001. All of the molar masses mentioned in this specification have the unit [g/mol].

To produce the inventive antistatic, thermoplastic polyurethane, the organic and/or modified polyisocyanates (a) are reacted with the at least one relatively high-molar-mass compound (b) having hydrogen atoms reactive toward isocyanates, and if appropriate with low-molar-mass chain extenders (c), with antistatic additive (d) comprising ethylmethylimidazole ethyl sulfate, with catalysts (e), and, if appropriate, with other additives (f), preferably in amounts such that the isocyanate index is in the range from 90 to 110, preferably from 92-105, and particularly preferably from 95-101.

For the purposes of the present invention, the isocyanate index here is the stoichiometric ratio of isocyanate groups to groups reactive toward isocyanate, multiplied by 100. Groups reactive toward isocyanate here are any of the groups which are present in the reaction mixture and are reactive toward isocyanate, inclusive of chemical blowing agents, but not the isocyanate group itself.

The inventive antistatic, thermoplastic polyurethane can be produced by the known processes either continuously, for example using reactive extruders or using the belt process, by the one-shot method or by the prepolymer method, or batchwise by the known prepolymer process. The components used in these processes: (a), (b), if appropriate, (c), (d), (e), and, if appropriate, (f) are mixed in succession or simultaneously with one another to give a reaction mixture, whereupon the reaction immediately begins.

In the extruder process components (a), (b), if appropriate, (c), (d), (e), and, if appropriate, (f) are introduced individually or in the form of a mixture into the extruder, e.g. at temperatures of from 100 to 280° C., preferably from 140 to 250° C., and reacted to give the antistatic, thermoplastic polyurethane. The resultant antistatic, thermoplastic polyurethane is usually extruded, cooled, and pelletized. The antistatic, thermoplastic polyurethane can, if appropriate, after synthesis, be modified via compounding in an extruder. This compounding can modify the antistatic, thermoplastic polyurethane by way of example in terms of its melt index or of its pellet shape, in order to meet requirements.

In a further embodiment, a thermoplastic polyurethane is produced using components (a), (b), if appropriate, (c), (e), and, if appropriate, (f) by the abovementioned processes. This thermoplastic polyurethane is then extruded, preferably in an extruder, with an active-ingredient concentrate comprising a thermoplastic polyurethane with a high concentration of antistatic additive (d), for example from 30 to 80% by weight, based on the total weight of the active-ingredient concentrate, to give the inventive thermoplastic polyurethane.

The antistatic, thermoplastic polyurethane produced according to the invention, and usually taking the form of pellets or of powder, is processed by conventional processes, e.g. injection molding or extrusion, to give injection-molded items and extruded items, e.g. the desired foils, moldings, rollers, fibers, cladding for automobiles, hoses, cable plugs, bellows, drag cables, cable sheathing, gaskets, drive belts, or damping elements. These injection-molded items and extruded items can also be composed of compounded materials comprising the inventive antistatic, thermoplastic polyurethane and comprising at least one further thermoplastic, particularly a polyethylene, polypropylene, polyester, polyether, polystyrene, polycarbonate, PVC, ABS, ASA, SAN, polyacrylonitrile, EVA, PBT, PET, polyoxymethylene. In particular, the inventive antistatic polyurethane can be processed for production of transparent articles, such as transparent conveying hoses for conveying powders, transparent shoe soles, and transparent foils and hoses, and also transparent cable sheathing. The production of transparent polyurethane here is known to the person skilled in the art. For example, transparent polyurethane can be obtained via rapid cooling of the TPU melt or via use of relatively short-chain polyols.

Surprisingly, ethylmethylimidazole ethyl sulfate gives a transparent solution in thermoplastic polyurethane, and transparent, antistatic materials can thus be obtained using transparent, thermoplastic polyurethane. These materials can be used, for example, for production of conveying hoses for the conveying of powders. Furthermore, inventive antistatic, thermoplastic polyurethanes exhibit very good mechanical properties, such as abrasion, tensile strength, and tensile strain at break, these being better, for identical conductivities, than when conventional antistatic additives are used. The observed amount of exudation of ethylmethylimidazole ethyl sulfate from finished parts is only small, corresponding to that for other additives of the prior art.

The following examples are intended to illustrate the present invention:

According to Table 1, the following thermoplastic polyurethanes were produced in a reactive extruder, and pelletized, and processed in a commercially available injection-molding machine to give test plaques of thickness 2 mm and 6 mm, and then subjected to mechanical and optical testing. The constitution of the starting substances are given in Table 1, as also are the test results.

TABLE 1

|  | Inv. Ex. 1 | Inv. Ex. 2 | Inv. Ex. 3 | Inv. Ex. 4 | Comp. Ex. 1 | Comp. Ex. 2 | Comp. Ex. 3 | Comp. Ex. 4 |
|---|---|---|---|---|---|---|---|---|
| Iso | 18.5 | 18.5 | 18.5 | 18.5 | 18.5 | 18.5 | 18.5 | 18.5 |
| Polyol | 51.4 | 51.4 | 51.4 | 51.4 | 51.4 | 51.4 | 51.4 | 51.4 |
| Ch. Ext. | 4.7 | 4.7 | 4.7 | 4.7 | 4.7 | 4.7 | 4.7 | 4.7 |
| Plasticizer | 25 | 25 | 25 | 25 | 25 | 25 | 25 | 25 |
| CDM | 0.4 | 0.4 | 0.4 | 0.4 | 0.4 | 0.4 | 0.4 | 0.4 |
| AS1 | 0.5 | 1.0 | 2.0 | 0.8 | — | — | — | — |
| AS2 | — | — | — | — | — | 1.5 | — | — |
| AS3 | — | — | — | — | — | — | 0.8 | 2.0 |
| VR | 6.4E+07 | 3.1E+07 | 1.5E+07 | 3.5E+07 | 3.0E+10 | 1.9E+09 | 1.5E+08 | 6.0E+07 |
| Abrasion | 85 | 106 | 139 | 172 | 78 | 70 | 158 | 150 |
| Tensile | 29 | 28 | 30 | 22 | 44 | 32 | 21 | 18 |
| Strain | 870 | 880 | 850 | 900 | 820 | 910 | 900 | 940 |
| Transp. | Y | Y | Y | Y | Y | N | N | N |
| Hardness | 65 | 64 | 64 | 60* | 65 | 63 | 60 | 62 |
| Exudation | 2 | 2 | 3 | 2 | 2 | 4 | 4 | 5 |
| MFR | 27.5 | 32.7 | 31.2 | n.m. | 24.8 | 62 | n.m. | 103 |
| MM degradation | 1 | 2 | 2 | — | — | 4 | — | 5 |

*resulting from addition of concentrate
Key:
Iso: Methylenediphenylene 4,4'-diisocyanate
Polyol: Butanediol adipate, molar mass 2400 g/mol
Ch Ext.: 1,4-Butanediol chain extender
Plasticizer: Dipropylene glycol dibenzoate
CDM: Carbodiimide hydrolysis stabilizer
AS1: Ethylmethylimidazole ethyl sulfate antistatic agent
AS2: Dehydat® 80X from Cognis (sodium salt of C13-C17 alkanesulfonate)
AS3: Catafor® PU from Rhodia (quaternary ammonium salt)
VR: Volume resistivity in Ω/cm
Abrasion: Abrasion to DIN 53516 in $mm^3$
Tensile: Tensile strenght to DIN 53504 in $N/mm^2$
Strain: Tensile strain at break to DIN 53504 in %
Transp.: Transparent: yes/no
Hardness: Shore A hardness to DIN 53505
Exudation: Amount of exuded additive on scale from 1 to 5 (1 = no exudation, 5 = severe exudation)
MFR Melt flow rate at 190° C. using 3.8 kg to DIN EN ISO 1133
MM degradion Relative molar-mass degradation with respect to parent polymer on a scale from 1 to 5 (1 = no degradation, 5 = severe degradation)
n.m. Not measured Comp. Ex. 1 is the parent material without antistatic agents.

In Inv. Ex. 4, 0.8% of antistatic agent in the form of a 20% strength concentrate was added to Comp. Ex. 1 prior to processing by injection molding.

The invention claimed is:

1. An antistatic, thermoplastic polyurethane, comprising ethylmethylimidazole ethyl sulfate.

2. The antistatic, thermoplastic polyurethane according to claim 1, which is transparent.

3. The antistatic, thermoplastic polyurethane according to claim 1, wherein an amount of the ethylmethylimidazole ethyl sulfate, based on a total weight of the thermoplastic polyurethane, is from 0.001 to 30% by weight.

4. The antistatic, thermoplastic polyurethane according to claim 3, wherein an amount of the ethylmethylimidazole ethyl sulfate, based on the total weight of the thermoplastic polyurethane, is from 0.1 to 5% by weight.

5. A conveying hose, comprising the antistatic, thermoplastic polyurethane according to claim 2.

6. A foil, hose, or cable sheath, comprising the antistatic, thermoplastic polyurethane according to claim 1.

7. A shoe sole, comprising the antistatic, thermoplastic polyurethane according to claim 1.

8. The polyurethane of claim 1, having a volume resistivity of 1.5E+07 to 6.4E+07 Ω/cm.

9. The polyurethane of claim 1, having the following mechanical properties:
an abrasion resistance to DIN 53516 of 85 to 172 mm3;
a tensile strength to DIN 53504 of 22 to 30 N/mm2;
a tensile strain at break to DIN 53504 of 850% to 900%; and
a Shore A hardness to DIN 53505 of 60 to 65.

10. An active-ingredient concentrate, comprising from 30 to 80% by weight, based on a total weight of the active-ingredient concentrate, of ethylmethylimidazole ethyl sulfate and from 70 to 30% by weight of a thermoplastic polyurethane.

11. A process for producing the antistatic, thermoplastic polyurethane according to claim 1, the process comprising mixing
a) at least one organic or modified polyisocyanate, or both, with
b) at least one relatively high-molar-mass compound having at least one hydrogen atom reactive toward isocyanate,
d) an antistatic additive comprising ethylmethylimidazole ethyl sulfate, and
e) at least one catalyst,
to give a reaction mixture, and reacting said reaction mixture to form an antistatic, thermoplastic polyurethane.

12. The process according to claim 11, further comprising mixing a low-molar-mass chain extender with the at least one relatively high-molar-mass compound.

13. The process according to claim 11, further comprising mixing an additional additive.

14. The process of claim 11, wherein the at least one organic or modified polyisocyanate a) is an aliphatic, cycloaliphatic, araliphatic, or aromatic diisocyanate, or mixtures thereof.

15. The process of claim 11, wherein the at least one relatively high-molar-mass compound b) is a polyesterol, a polyetherol, a polycarbonatediol, or mixtures thereof.

16. The process of claim 12, wherein the low-molar-mass chain extender is an analiphatic, araliphatic, aromatic, or cycloaliphatic compound, or a mixture thereof.

17. The process of claim 11, wherein the at least one catalyst is a tertiary amine.

18. The process of claim 17, wherein the tertiary amine is selected from the group consisting of triethylamine, dimethylcyclohexylamine, N-methylmorpholine, N,N'-dimethylpiperazine, 2-(dimethylaminoethoxy)ethanol, and diazabicyclo[2.2.2]octane.

19. The process of claim 13, wherein the additional additive is a blowing agent, a surfactant, a filler, a nucleating agent, a lubricant, a mold release agent, a dye, a pigment, an antioxidant, or mixtures thereof.

20. The process of claim 12, wherein a ratio by weight of the relatively high-molar-mass compound (b) to the chain extender (c) is from 0.5:1 to 20:1.

* * * * *